(12) United States Patent
Kishimoto et al.

(10) Patent No.: US 10,559,407 B2
(45) Date of Patent: Feb. 11, 2020

(54) PROCESS FOR PRODUCING ELECTRICAL WIRE MOLDED BODY

(75) Inventors: Shinichi Kishimoto, Tokyo (JP); Shinichi Saito, Tokyo (JP); Hideo Ohsawa, Tokyo (JP)

(73) Assignee: Riken Technos Corporation, Tokyo (JP)

( * ) Notice: Subject to any disclaimer, the term of this patent is extended or adjusted under 35 U.S.C. 154(b) by 0 days.

(21) Appl. No.: 14/124,830

(22) PCT Filed: May 1, 2012

(86) PCT No.: PCT/JP2012/061548
§ 371 (c)(1),
(2), (4) Date: Feb. 27, 2014

(87) PCT Pub. No.: WO2012/169298
PCT Pub. Date: Dec. 13, 2012

(65) Prior Publication Data
US 2014/0227518 A1    Aug. 14, 2014

(30) Foreign Application Priority Data

Jun. 8, 2011   (JP) .................................. 2011-128583

(51) Int. Cl.
| H01B 13/00 | (2006.01) |
| H01B 13/14 | (2006.01) |
| H01B 3/44  | (2006.01) |
| B05D 7/20  | (2006.01) |
| B05D 1/26  | (2006.01) |
| C23C 2/38  | (2006.01) |

(52) U.S. Cl.
CPC ............. H01B 13/148 (2013.01); H01B 3/44 (2013.01); H01B 13/145 (2013.01); B05D 1/265 (2013.01); B05D 7/20 (2013.01); B05D 2256/00 (2013.01); C23C 2/38 (2013.01); *Y10T 428/2967* (2015.01)

(58) Field of Classification Search
CPC ...... B05D 1/265; B05D 7/20; B05D 2256/00; H01B 13/14; H01B 13/16; C23C 2/38
USPC ...................... 427/117–120, 356, 358, 393.3
See application file for complete search history.

(56) References Cited

U.S. PATENT DOCUMENTS

| 4,549,041 A | * | 10/1985 | Shingo .................... C08K 3/22 174/113 R |
| 4,732,939 A | * | 3/1988 | Hoshi .................. C08F 255/00 524/436 |
| 4,751,270 A | * | 6/1988 | Urawa .................. C08F 255/02 525/244 |
| 4,814,130 A | * | 3/1989 | Shiromatsu .......... B29C 47/367 264/171.19 |
| 5,439,965 A | * | 8/1995 | Horwatt ............... C08K 3/2279 524/264 |
| 6,107,413 A |   | 8/2000 | Mori |
| 6,455,637 B1 | * | 9/2002 | Jackson ............... B29C 61/003 525/191 |
| 2008/0105454 A1 | * | 5/2008 | Morioka ............... H01B 7/295 174/120 SR |
| 2009/0130356 A1 | * | 5/2009 | Moriuchi ........... C08L 23/0853 428/36.9 |
| 2009/0301751 A1 | * | 12/2009 | Iwasaki ..................... C08F 8/00 174/110 SR |
| 2010/0132974 A1 | * | 6/2010 | Inagaki ................. C08F 255/00 174/110 SR |

FOREIGN PATENT DOCUMENTS

| CN | 101679717 A    |   | 3/2010 |
| JP | 09-235431 A    |   | 9/1997 |
| JP | 11-181188 A    |   | 7/1999 |
| JP | 2000-212291 A  |   | 8/2000 |
| JP | 2005-002245 A  |   | 1/2005 |
| JP | 2005-239997 A  |   | 9/2005 |
| JP | 2006077092     | * | 3/2006 |
| JP | 2006-131720 A  |   | 5/2006 |
| JP | 2006-225568 A  |   | 8/2006 |
| JP | 2006265507     | * | 10/2006 |
| JP | 2011-057989 A  |   | 3/2011 |

OTHER PUBLICATIONS

International Search Report for Application No. PCT/JP2012/061548 dated Jul. 31, 2012 (2 Pages).
Extended European Search Report for Application No. 12796484.9, dated Mar. 17, 2015 (8 pages).
Chinese Office Action for Application No. 201280038294.6, dated Jul. 22, 2015 (12 pages).

* cited by examiner

*Primary Examiner* — Brian K Talbot
(74) *Attorney, Agent, or Firm* — Nutter McClennen & Fish LLP

(57) ABSTRACT

There are provided a process for producing an electrical wire molded body comprising: step I of melting and kneading a polyethylene-based resin (a), a polypropylene-based resin (b), a block copolymer (c) of an aromatic vinyl-based compound and a conjugated diene-based compound and the like, and a silane coupling agent (g), and other components, to produce a silane crosslinkable flame retardant polyolefin (A); step II of melting and kneading a polymer selected from the components (a) to (c) and a silanol condensation catalyst (i), to produce a silanol catalyst rein composition (B); and step III of mixing the components (A) and (B), melt molding the mixture on a conductor and then crosslinking the molded body in the presence of water.

7 Claims, No Drawings

PROCESS FOR PRODUCING ELECTRICAL WIRE MOLDED BODY

TECHNICAL FIELD

The present invention relates to a process for producing an electrical wire molded body, and, specifically, relates to a process for producing an electrical wire molded body comprising step I of producing component (A) (a silane crosslinkable flame retardant polyolefin), step II of producing component (B) (a silanol catalyst resin composition) and step III of mixing components (A) and (B) and melt molding the mixture on a conductor, the process characterized by involving the production of the components (A) and (B), respectively, by melting and kneading specific components in a specific weight ratio and the use thereof. The process for producing an electrical wire molded body according to the present invention ensures production of an electrical wire molded body having both of mechanical properties and flame retardance at high levels as compared with those of conventional products.

BACKGROUND ART

In recent years, studies have been made on electrical wires coated with a halogen-free flame retardant resin composition which is low fuming and generates less harmful gas such as hydrogen halide, from the viewpoint of fire safety. As the halogen-free flame retardant resin composition, those comprising a polyolefin-based resin as a base polymer and a metal hydrate such as aluminum hydroxide or magnesium hydroxide in a large amount as a flame retardant are mainly used.

However, polyolefins used as the base polymer, such as polyethylene, ethylene/α-olefin copolymers, ethylene/vinyl acetate copolymers (EVA) and ethylene/ethyl acrylate copolymers (EEA), are, more or less, crystalline polymers having a crystal part within a normal temperature region, and therefore have relatively high rigidity and require the incorporation of a flame retardant metal hydrate which is an inorganic compound in a large amount, thereby failing to provide sufficient elongation, flexibility and molding processability required of electrical wire molded bodies. Therefore, a low-crystalline, flexible base polymer must be used to reduce the rigidity. However, the reduction in crystallinity of the base polymer causes the problem of reduction in strength of an electrical wire molded body, and also leads to a lowered melting point of the base polymer and a significantly-increased heating deformability even at a relatively low temperature, thereby causing the problem of reduction in heat resistance of an electrical wire molded body. Thus, in order to compensate for such reduction in strength and heat resistance, crosslinking among these polymers is commonly carried out.

While methods such as electron beam crosslinking, crosslinking by means of a crosslinking agent and silane crosslinking are used for such crosslinking, above all, silane crosslinking, advantageously, does not require large-scale production facilities, and is easy to operate. However, silane crosslinking for an electrical wire molded body made of a polyolefin composition comprising a large amount of a metal hydrate as a flame retardant involves the problem of attaining a sufficient degree of crosslinking while preventing early crosslinking by contact between a metal hydroxide and a crosslinking component.

On the one hand, strict flame retardance standards, for example, Vertical Flame Test defined in UL1581 (Reference Standard for Electrical Wires, Cables, and Flexible Cords)), etc., VW-1 standard, horizontal flame retardance standard as well as 60-degree inclined flame retardant characteristic defined in JIS C3005, and the like are defined for electrical wire molded bodies. In recent years, electrical wire molded bodies are required to correspond to more strict flame retardance standards. Besides, from the viewpoint of safety, standards tend to be defined for physical properties other than flame retardance, and there is a growing demand for materials having high flame retardance as well as excellent physical properties including heat resistance.

Therefore, crosslinking steps have been variously reviewed in the production of an electrical wire molded body from a silane crosslinkable flame retardant polyolefin.

For example, Patent Document 1 discloses a process comprising melting and mixing a flame retardant polyolefin comprising a silanol condensation catalyst, a metal hydrate and a water absorbing agent and a carrier polymer comprising an unsaturated silane compound, and then crosslinking the mixture in a moisture content.

Patent Document 2 discloses a process comprising melting and mixing a component comprising a silane grafted polyolefin and a metal hydrate and a component comprising a polyolefin, a silanol condensation catalyst and a crosslinking agent, and then crosslinking the mixture in a moisture content.

Patent Document 3 discloses a process comprising melting and mixing a resin composition comprising a polyolefin, an organic peroxide, a silanol condensation catalyst and a metal hydrate and a silane-modified polyolefin, and then crosslinking the mixture in a moisture content.

However, these crosslinking processes are problematic in uniform dispersibility of the metal hydrate, complicated steps and the like, and no process for efficiently producing an electrical wire molded body having not only flame retardance but also other properties at high levels has been obtained.

PRIOR ART DOCUMENTS

Patent Documents

Patent Document 1: JP H9-235431 A
Patent Document 2: JP 2000-212291 A
Patent Document 3: JP 2006-131720 A

SUMMARY OF THE INVENTION

Problem to Be Solved by the Invention

In light of the above problems, the present invention aims at providing a process for efficiently producing an electrical wire molded body comprising a silane crosslinkable flame retardant polyolefin composition and having both of flame retardance and physical properties including heat resistance at high levels.

The present inventor, as a result of earnest studies to attain the above object, has found that an electrical wire molded body having both of flame retardance and physical properties including heat resistance at high levels are obtained by a process comprising the steps of producing a silane crosslinkable flame retardant polyolefin component comprising a base polymer, an organic peroxide, a silane coupling agent and a metal hydrate in a specific weight ratio, producing a silanol catalyst composition comprising a polymer and a silanol condensation catalyst in a specific weigh ratio, and melting and mixing the silane crosslinkable flame retardant polyolefin component and the silanol catalyst composition in a specific weight ratio and molding the mixture, and then has accomplished the present invention.

Specifically, the present invention is as defined below.

(1) A process for producing an electrical wire molded body comprising:

step I of melting and kneading 30 parts to 100 parts by weight of component (a): a polyethylene-based resin, 0 part to 40 parts by weight of component (b): a polypropylene-based resin, 0 part to 40 parts by weight of component (c): a block copolymer of an aromatic vinyl-based compound and a conjugated diene-based compound and/or a hydrogenated product thereof, 0 part to 15 parts by weight of component (d): an acid-modified resin and 0 part to 30 parts by weight of component (e): a non-aromatic softening agent for rubber (provided that the total amount of the components (a), (b), (c), (d) and (e) is defined as 100 parts by weight), and 0.1 part to 1 part by weight of component (f): an organic peroxide, 1 part to 6 parts by weight of component (g): a silane coupling agent and 50 parts to 250 parts by weight of component (h): a metal hydrate based on 100 parts by weight of the total amount of the components (a), (b), (c), (d) and (e), all at once, at a temperature equal to or higher than the reaction temperature of the component (f): organic peroxide, to produce component (A) (a silane crosslinkable flame retardant polyolefin); step II of melting and kneading 100 parts by weight of at least one polymer selected from the group consisting of the components (a), (b) and (c) and 0.1 part to 8 parts by weight of component (i): a silanol condensation catalyst, to produce component (B) (a silanol catalyst rein composition); and step III of mixing the components (A) and (B) in a ratio of (A):(B)=10:1 to 100:1 (weight ratio), melt molding the mixture on a conductor and then crosslinking the molded body in the presence of water.

Processes for producing an electrical wire molded body as defined in the following items (2) to (8) can be indicated as preferred embodiments.

(2) The process for producing an electrical wire molded body as defined in the above-described item (1), wherein the component (a): polyethylene-based resin is at least one polymer selected from the group consisting of an ethylene homopolymer, an ethylene/α-olefin copolymer, an ethylene/ethyl acrylate copolymer (EEA), an ethylene/methyl methacrylate copolymer (EMMA), an ethylene/vinyl acetate copolymer (EVA), and an ethylene/ethyl methacrylate copolymer (EMA).

(3) The process for producing an electrical wire molded body as defined in the above-described item (1) or (2), wherein the component (d): acid-modified resin is an acid-modified polyolefin and/or acid-modified styrene-based elastomer.

(4) The process for producing an electrical wire molded body as defined in any of the above-described items (1) to (3), wherein the component (h): metal hydrate is magnesium hydroxide and/or aluminum hydroxide.

(5) The process for producing an electrical wire molded body as defined in any of the above-described items (1) to (4), wherein the component (h): metal hydrate is an untreated and/or fatty acid-treated metal hydrate.

(6) The process for producing an electrical wire molded body as defined in any of the above-described items (1) to (5), wherein the melt molding is melt extrusion molding.

(7) The process for producing an electrical wire molded body as defined in any of the above-described items (1) to (6), wherein the electrical wire molded body is intended for solar cables.

(8) The process for producing an electrical wire molded body as defined in any of the above-described items (1) to (7), wherein the electrical wire molded body is adapted to the hot set test as defined in TUV2Pfg1169.

Also, the present invention is as defined below.

(9) An electrical wire molded body produced by the process for producing an electrical wire molded body as defined in any of the above-described items (1) to (8).

(10) The electrical wire molded body as defined in the above-described item (9), which is intended for solar cables.

(11) The electrical wire molded body as defined in the above-described item (9) or (10), which is adapted to the hot set test as defined in TUV2Pfg1169.

Effect of the Invention

The present invention ensures efficient production of an electrical wire molded body which has attained not only flame retardance, but also heat resistance, strength, elongation and appearance at high levels.

The electrical wire molded body obtained by the production process according to the present invention has not only flame retardance, but also heat resistance, strength, elongation and appearance at high levels, and thus can be further processed and used as various electrical wire coating materials, and is especially suitable for solar cables used under severe conditions for a long term.

DETAILED DESCRIPTION OF THE INVENTION

[Step I]

Step I of the present invention is a step of producing component (A) (a silane crosslinkable flame retardant polyolefin).

Component (A) essentially comprises 30 parts to 100 parts by weight of (a) a polyethylene-based resin, 0 part to 40 parts by weight of (b) a polypropylene-based resin, 0 part to 40 parts by weight of (c) a block copolymer of an aromatic vinyl-based compound and a conjugated diene-based compound and/or a hydrogenated product thereof, 0 part to 15 parts by weight of (d) an acid-modified resin and 0 part to 30 parts by weight of (e) a non-aromatic softening agent for rubber (provided that the total amount of the components (a), (b), (c), (d) and (e) is defined as 100 parts by weight), and 0.1 part to 1 part by weight of (f) an organic peroxide, 1 part to 6 parts by weight of (g) a silane coupling agent and 50 part to 250 parts by weight of (h) a metal hydrate based on 100 parts by weight of the total amount of the components (a), (b), (c), (d) and (e). In step I, the components for the component (A) including the components (a), (b), (c), (d), (e), (f), (g) and (h) are molten and kneaded, all at once, at a temperature equal to or higher than the reaction temperature of the (f) organic peroxide.

An ethylene homopolymer, an ethylene/α-olefin copolymer, an ethylene/unsaturated carboxylic acid ester copolymer, an ethylene/unsaturated ester copolymer and the like can be used as the (a) polyethylene-based resin. Specifically, low/medium/high-density polyethylene, an ethylene/ethyl acrylate copolymer (EEA), an ethylene/methyl methacrylate copolymer (EMMA), an ethylene/ethyl methacrylate copolymer (EMA), an ethylene/vinyl acetate copolymer (EVA) and the like can be used. The component (a) may be one polymer selected from the various polymers described above, or may be a mixture of two or more polymers selected from the various polymers described above. Polymers usable as the (a) component are an ethylene/vinyl acetate copolymer (EVA) having a vinyl acetate content of 20% to 80% by weight, preferably 25% to 45% by weight and an ethylene/α-olefin copolymer synthesized in the presence of a metallocene catalyst.

The density of the component (a) is preferably 0.915 g/cm$^3$ or less, more preferably 0.905 g/cm$^3$ or less, in consideration for flexibility. Also, the density of the component (a) is preferably 0.870 g/cm$^3$ or more, more preferably 0.880 g/cm$^3$ or more, in consideration for tensile strength. The melt mass flow rate (in conformity to JIS K6924-2; measured at 190° C. and a load of 2.16 kg) of the component (a) is preferably 0.1 g to 20 g/10 min.

The amount of the component (a) to be incorporated is 30 parts to 100 parts by weight, preferably 40 parts to 80 parts by weight based on 100 parts by weight of the total amount of the components (a), (b), (c), (d) and (e). An amount of less than 30 parts by weight is not preferred as causing the reduction in strength of the electrical wire molded body obtained.

Both of propylene homopolymers and propylene/α-olefin copolymers can be used as the (b) polypropylene-based resin. Both of random copolymers and block copolymers can be used as the propylene/α-olefin copolymers. Specific examples are, for example, propylene/ethylene random copolymers, propylene/ethylene block copolymers, propylene/ethylene random block copolymers, propylene/butene-1 copolymers and propylene/ethylene/butene-1 terpolymers. Crystalline propylene (co)polymers are preferred as the (b) component. As the crystalline propylene (co)polymers, those having a melting point (Tm), as measured by DSC, of 140° to 167° C., preferably 150° to 167° C. and ΔHm ranging from 25 mJ to 83 mJ/mg are preferably used in terms of heat resistance of the electrical wire molded body obtained.

The amount of the component (b) to be incorporated is 0 part to 40 parts by weight, preferably 5 parts to 25 parts by weight based on 100 parts by weight of the total amount of the components (a), (b), (c), (d) and (e). An amount of more than 40 parts by weight is not preferred as causing the deterioration in flexibility of the electrical wire molded body obtained.

The (c) block copolymer of an aromatic vinyl-based compound and a conjugated diene-based compound and/or hydrogenated product thereof are/is a block copolymer comprising at least two polymer blocks A mainly comprising an aromatic vinyl compound and at least one polymer block B mainly comprising a conjugated diene compound, and a hydrogenated block copolymer obtained by hydrogenation of the block copolymer. For example, they are a block copolymer of an aromatic vinyl compound—a conjugated diene compound, having the structure A-B-A, B-A-B-A, A-B-A-B-A or the like and a hydrogenated block copolymer thereof. The above-described (hydrogenated) block copolymer (hereinafter, the (hydrogenated) block copolymer means a block copolymer and/or a hydrogenated block copolymer) comprises 5% to 60% by weight, preferably 20% to 50% by weight of an aromatic vinyl compound.

The polymer block A mainly comprising an aromatic vinyl compound preferably consists of an aromatic vinyl compound alone, or is a copolymer block of 50% by weight or more, preferably 70% by weight or more of an aromatic vinyl compound and a (hydrogenated) conjugated diene compound (hereinafter, the (hydrogenated) conjugated diene compound means a conjugated diene compound and/or a hydrogenated conjugated diene compound).

The polymer block B mainly comprising a (hydrogenated) conjugated diene compound preferably consists of a (hydrogenated) conjugated diene compound alone, or is a copolymer block of 50% by weight or more, preferably 70% by weight or more of a (hydrogenated) conjugated diene compound and an aromatic vinyl compound.

In these polymer block A mainly comprising an aromatic vinyl compound and polymer block B mainly comprising a (hydrogenated) conjugated diene compound, respectively, the distribution of the aromatic vinyl compound or (hydrogenated) conjugated diene compound in the molecular chain may be random, tapered (in which monomer components increase or decrease along the molecular chain), partly blocked or any combination thereof.

When there are two or more polymer blocks A mainly comprising an aromatic vinyl compound or polymer blocks B mainly comprising a (hydrogenated) conjugated diene compound, they may be either identical or different in structure.

As the aromatic vinyl compound which constitutes the (hydrogenated) block copolymer, one or two or more of styrene, a-methylstyrene, vinyl toluene, p-tert-butyl styrene and the like is/are selected, and, among others, styrene is preferred. Also, as the conjugated diene compound, one or two or more of butadiene, isoprene, 1,3-pentadiene, 2,3-dimethyl-1,3-butadiene and the like is/are selected, and, among others, butadiene, isoprene and a combination thereof are preferred.

In the (c) hydrogenated block copolymer of an aromatic vinyl-based compound and a conjugated diene-based compound, those wherein at least 90% of aliphatic double bonds based on the conjugated diene compound are hydrogenated are preferred.

The weight average molecular weight of the hydrogenated block copolymer with the above-described structure used in the present invention preferably ranges from 5,000 to 1,500,000, more preferably ranges from 10,000 to 550,000, even more preferably ranges from 50,000 to 400,000. The molecular weight distribution (ratio (Mw/Mn) between the weight average molecular weight (Mw) and the number average molecular weight (Mn)) is preferably 10 or less, more preferably 5 or less, even more preferably 2 or less. The molecular structure of the hydrogenated block copolymer may be any of linear, branched, radial and arbitrary combinations thereof. In the meantime, the molecular weight according to the present invention is a value obtained by GPC based on polystyrene whose molecular weight is known as a reference. Thus, the value is a relative value, not an absolute value, and further can vary within a range of about ±30% depending on the conditions for GPC including the reference sample, device and data processing method etc.

While a number of processes have been proposed as processes for producing these block copolymers, a typical process is, for example, the process described in JP S40-23798 A in which such a block copolymer can be obtained by block polymerization in an inert solvent by use of a lithium catalyst or Ziegler type catalyst. The block copolymer obtained by the above-described process is hydrogenated in the presence of a hydrogenation catalyst in an inert solvent, thereby giving a hydrogenated block copolymer.

Specific examples of the above-described (hydrogenated) block copolymer can include a styrene-butadiene-styrene copolymer (SBS), a styrene-isoprene-styrene copolymer (SIS), a styrene-ethylene/butene-styrene copolymer (SEBS), a styrene-ethylene/propylene-styrene copolymer (SEPS), a styrene-ethylene/ethylene/propylene-styrene copolymer (SEEPS) and a partially hydrogenated styrene-butadiene-styrene copolymer (SBBS) and the like. In the present invention, the (hydrogenated) block copolymer may be used singly, or two or more thereof may be used as a mixture.

The amount of the component (c) to be incorporated is 0 part to 40 parts by weight, preferably 5 parts to 30 parts by weight based on 100 parts by weight of the total amount of the components (a), (b), (c), (d) and (e). An amount of more than 40 parts by weight is not preferred as causing the deterioration in strength of the electrical wire molded body obtained.

Any resins can be used as the (d) acid-modified resin so long as they are resins modified with unsaturated carboxylic acid or derivatives thereof. Examples of the unsaturated carboxylic acid can include, for example, maleic acid, itaconic acid and fumaric acid, and examples of the derivatives thereof include, for example, esters and anhydrides of these acids such as monoester maleate, diester maleate, maleic anhydrides, monoester itaconate, diester itaconate, itaconic anhydrides, monoester fumarate, diester fumarate and fumaric anhydrides. Examples of the above-described resin include ethylene-based polymers such as linear polyethylene, ultralow-density polyethylene, high-density polyethylene, ethylene-vinyl acetate (VA) copolymers, ethylene-ethyl acrylate (EA) copolymers and ethylene-methacrylate copolymers; propylene-based polymers; and styrene-based elastomers (SEBS, SEPS and SEEPS). The above-described resin is preferably an ethylene-based polymer in terms of compatibility with the (a) polyethylene-based resin.

The amount of the component (d) to be incorporated is 0 part to 15 parts by weight, preferably 0 part to 10 parts by weight based on 100 parts by weight of the total amount of the components (a), (b), (c), (d) and (e). An amount of more than 15 parts by weight is not preferred as the electrical wire molded body obtained is too hard.

Non-aromatic mineral oil or liquid or low-molecular-weight synthetic softening agents are indicated as the (e) non-aromatic softening agent for rubber. Mineral oil softening agents generally used for rubber are mixtures of an aromatic ring, a naphthene ring and a paraffin chain in combination, and categorized into, what is called, paraffin-based softening agents in which the number of carbon atoms in the paraffin chain occupies 50% or more of the total number of carbon atoms; naphthene-based softening agents in which the number of carbon atoms in the naphthene ring occupies 30% to 40% thereof; and aromatic softening agents in which the number of aromatic carbon atoms occupies 30% or more thereof. The mineral oil-based softening agent for rubber used as the component (e) of the present invention is the paraffin-based and naphthene-based softening agents in the above-described categories. The mineral oil softening agent for rubber used in the present invention is preferably the above-described paraffin-based and naphthene-based softening agents. The aromatic softening agent is not preferred because of its poor dispersibility.

The paraffin-based mineral oil softening agent is especially preferred as the non-aromatic hydrocarbon-based softening agent for rubber, and those containing a small amount of aromatic ring component are particularly suitable among the paraffin-based ones.

Examples of the compound which constitutes the paraffin-based softening agent can include paraffin-based compounds having 4 to 155 carbon atoms, preferably paraffin-based compounds having 4 to 50 carbon atoms, specifically, n-paraffins (linear saturated hydrocarbons) such as butane, pentane, hexane, heptane, octane, nonane, decane, undecane, dodecane, tridecane, tetradecane, pentadecane, hexadecane, heptadecane, octadecane, nonadecane, eicosane, heneicosane, docosane, tricosane, tetracosane, pentacosane, hexacosane, heptacosane, octacosane, nonacosane, triacontane, hentriacontane, dotriacontane, pentatriacontane, hexacontane and heptacontane; isoparaffins (branched saturated hydrocarbons) such as isobutane, isopentane, neopentane, isohexane, isopentane, neohexane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethylpentane, 2,2,3-trimethylbutane, 3-methylheptane, 2,2-dimethylhexane, 2,3-dimethylhexane, 2,4-dimethylhexane, 2,5-dimethylhexane, 3,4-dimethylhexane, 2,2,3-trimethylpentane, isooctane, 2,3,4-trimethylpentane, 2,3,3-trimethylpentane, 2,3,4-trimethylpentane, isononane, 2-methylnonane, isodecane, isoundecane, isododecane, isotridecane, isotetradecane, isopentadecane, isooctadecane, isononanodecane, isoeicosane and 4-ethyl-5-methyloctane; and derivatives of these saturated hydrocarbons. These paraffins are preferably used as a mixture and are in a liquid form at room temperature.

Commercial products of paraffin-based softening agents which are in a liquid form at room temperature include, for example, NA Solvent (isoparaffin-based hydrocarbon oil) manufactured by Nippon Oil & Fats Co., Ltd.; PW-90 (n-paraffin-based process oil) manufactured by Idemitsu Kosan Co., Ltd.; IP-Solvent 2835 (synthetic isoparaffin-based hydrocarbon, containing 99.8% by weight or more of isoparaffin) manufactured by Idemitsu Petrochemical Co., Ltd. and NEO THIOZOL (n-paraffin-based process oil) manufactured by Sanko Chemical Industry Co., Ltd.

The amount of the component (e) to be incorporated is 0 part to 30 parts by weight, preferably 0 part to 20 parts by weight based on 100 parts by weight of the total amount of the components (a), (b), (c), (d) and (e). An amount of more than 30 parts by weight is not preferred as easily causing breeding-out and being likely to impart stickiness to the electrical wire molded body obtained, thereby leading to the deterioration in mechanical properties.

Examples of the (f) organic peroxide include dicumyl peroxide, di-tert-butyl peroxide, 2,5-dimethyl-2,5-di-(tert-butyl peroxy)hexane, 2,5-dimethyl-2,5-di-(tert-butyl peroxy)hexyne-3, 1,3-bis(tert-butyl peroxyisopropyl)benzene, 1,1-bis(tert-butyl peroxy)-3,3,5-trimethylcyclohexane, n-butyl-4,4-bis(tert-butyl peroxy)valerate, benzoyl peroxide, p-chlorobenzoyl peroxide, 2,4-dichlorobenzoyl peroxide, tert-butyl peroxybenzoate, tert-butyl peroxyisopropyl-carbonate, diacetyl peroxide, lauroyl peroxide, tert-butyl cumyl peroxide, 1,1-di(t-hexylperoxy)-3,5,5-trimethylcyclohexane.

The amount of the component (f) to be incorporated is 0.1 part to 1 part by weight, preferably 0.2 part to 0.6 part by weight based on 100 parts by weight of the total amount of the components (a), (b), (c), (d) and (e). When the amount is less than 0.1 part by weight, crosslinking cannot be sufficiently attained, thereby causing the deterioration in strength of the electrical wire molded body obtained. An amount of more than 1 part by weight causes over-crosslinking, resulting in loss of flexibility of the electrical wire molded body obtained.

Examples of the (g) silane coupling agent include silane coupling agents having a vinyl or epoxy group at their terminal, such as vinyltrimethoxysilane, vinyltriethoxysilane, glycidoxypropyltrimethoxysilane, glycidoxypropyltriethoxysilane, glycidoxypropylmethyldimethoxysilane, methacryloxypropyltrimethoxysilane, methacryloxypropyl-triethoxysilane and methacryloxypropylmethyldimethoxysilane; silane coupling agents having a mercapto group at their terminal, such as mercaptopropyltrimethoxysilane and mercaptopropyltriethoxysilane; and silane coupling agents having an amino group, such as aminopropyltriethoxysilane, aminopropyltrimethoxysilane, N-(β-aminoethyl)-γ-aminopropyltripropyltrimethoxysilane and N-(β-aminoethyl)-γ-aminopropyltripropylmethyldimethoxysilane. Among these silane coupling agents, those having an epoxy group and/or a vinyl group at their terminal are further preferred. These silane coupling agents may be used singly or as a combination of two or more thereof.

While any compounds to be incorporated as an inorganic flame retardant can be used as the (h) metal hydrate without any particular limitation, compounds having a hydroxyl group or crystal water, such as hydromagnesite, magnesium hydroxide, aluminum hydroxide, potassium hydroxide, calcium hydroxide, hydrated aluminum silicate, hydrated magnesium silicate, basic magnesium carbonate and hydrotalcite, can be used singly or as a combination of two or more thereof. These compounds may be used singly or as a mixture of two or more thereof. Also, compounds treated with a surface treatment agent may be used as the metal hydrate in order to increase its affinity to resins. Silane compounds (silane coupling agents), fatty acids, phosphoric acid ester and the like can be used as the surface treatment agent. Fatty acids used as the surface treatment agent include, for example, saturated and unsaturated fatty acids such as stearic acid, oleic acid and lauric acid.

The amount of the component (h) to be incorporated is 50 parts to 250 parts by weight, preferably 55 parts to 230 parts by weight based on 100 parts by weight of the total amount of the components (a), (b), (c), (d) and (e). An amount of less than 50 parts by weight cannot provide sufficient flame retardance, whereas an amount of more than 250 parts by weight causes the reduction in flowability of the component (A) and the deterioration in dispersibility of the respective components, leading to impaired surface appearance and strength of the electrical wire molded body obtained.

Kneading machines such as a press kneader, a Banbury-Bumbary mixer, a single-screw extruder, a twin-screw extruder and a multi-screw extruder can be used for the melting and kneading of the components (a) to (h). The melting and kneading temperature is a temperature equal to or higher than the reaction temperature of the (f) organic peroxide, preferably a temperature equal to or higher than the one-minute half life temperature of the (f) organic peroxide used. Also, the upper limit of the melting and kneading temperature is determined in consideration of the deterioration of the resin component, softening agent component and flame retardant, and is preferably 250° C., more preferably 230° C.

[Step II]

Step II of the present invention is a step of melting and kneading a polymer and (i) a silanol condensation catalyst, to produce component (B) (a silanol condensation catalyst resin composition).

Examples of the (i) silanol condensation catalyst include dibutyltin dilaurate, dibutyltin diacetate, dibutyltin dioleate, stannous acetate, lead naphthenate, cobalt naphthenate, zinc caprylate, iron 2-ethylhexanoate, titanic acid ester, tetrabutyl titanate ester, tetranonyl titanate ester, bis(acetylacetonitrile) di-isopropyltitanium-ethylamine complexes, hexylamine complexes, dibutylamine complexes and pyridine complexes.

While at least one selected from the components (a), (b) and (c) used in the component (A) can be used as the polymer, the component (a) is preferred in terms of compatibility.

The content of the (i) silanol condensation catalyst is 0.1 part to 8 parts by weight, preferably 1 part to 5 parts by weight based on 100 parts by weight of the polymer. A content of less than 0.1 part by weight provides insufficient silane crosslinking, so that the target heat resistance cannot be obtained. A content of more than 8% by weight provides partly excessive crosslinking and causes scorching, thereby leading to an impaired appearance of the electrical wire molded body obtained.

Kneading machines such as a pressurization kneader, a Banbury mixer, a single-screw extruder, a twin-screw extruder and a multi-screw extruder can be used for the melting and kneading of the polymer and the component (i). The lower limit of the melting and kneading temperature is a temperature equal to or higher than the melting temperature of at least one polymer selected from the components (a), (b) and (c), and the upper limit thereof is determined in consideration of the deterioration of the resin component and catalyst component. The melting and kneading temperature preferably ranges from 100° C. to 250° C., more preferably ranges from 140° C. to 220° C.

[Step III]

Step III of the present invention is a step of mixing the component (A) produced in step I and the component (B) produced in step II, melt molding the mixture on a conductor (directly or on an insulating material coating applied onto the conductor) and then crosslinking the molded body in the presence of water. The mixing ratio between the components (A) and (B) is a weight ratio of (A):(B)=10:1 to 100:1, preferably 15:1 to 50:1. When the ratio of the component (B) is 10% or more, the extrusion appearance would be deteriorated. When the ratio of the component (B) is less than 1%, the degree of crosslinking would be lowered, so that no satisfactory heat resistance can be obtained. Various extruders can be used for the melting and kneading of the components (A) and (B). All of a single-screw extruder, a twin-screw extruder, a multi-screw extruder and the like can be used as the extruder. Crosslinking in the presence of water is conventionally carried out, and also can be carried out by immersion in warm water at 50° C. to 90° C. for 5 to 48 hours.

When the claimed composition (composition obtained by mixing, in step III, the components (A) and (B) obtained in steps I and II, respectively) is molded into an electrical wire molded body, the composition may be coated either directly on a conductor or on an insulating material coating applied onto the conductor.

The type of conductor is not limited, and may be any of copper, aluminum, alloy and the like, and the conductor may be formed by subjecting such a material to plating treatment or coating treatment. Also, the conductor may have any structure of twisted wire, shield wire, braided wire and the like.

[Other Components]

In the electrical wire molded body comprising a silane crosslinkable flame retardant polyolefin and a silanol catalyst resin composition according to the present invention, heat stabilizers, antioxidants, light stabilizers, ultraviolet absorbers, crystal nucleating agents, anti-blocking agents, sealability improving agents, mold release agents such as stearic acid and silicone oil, lubricants such as polyethylene wax, colorants, pigments, organic fillers such as alumina, foaming agents (organic, inorganic and microcapsule-based ones), flame retardants (red phosphorus, ammonium polyphosphate, antimony and silicone) and the like can be incorporated within such ranges that the object of the present invention is not impaired. The antioxidants include, for example, phenolic antioxidants such as 2,6-di-tert-butyl-p-cresol, 2,6-di-tert-butylphenol, 2,4-dimethyl-6-tert-butylphenol, 4,4-dihydroxydiphenyl, tris(2-methyl-4-hydroxy-5-tert-butylphenyl)butane; phosphite-based antioxidants; and thioether-based antioxidants. Among these, the phenolic antioxidants and phosphite-based antioxidants are especially preferred.

The electrical wire molded body obtained by the production process according to the present invention can be further processed and used in various electrical wire coating materials. The electrical wire molded body obtained by the production process according to the present invention comprises large amounts of metal hydrates uniformly dispersed therein, and is sufficiently crosslinked and thus has not only excellent flame retardance but also excellent heat resistance, strength, flexibility and molded article surface appearance. Excellent heat resistance can be confirmed from less deformation after exposure to a high temperature by the hot set test, which indicates that the electrical wire molded body obtained by the production process according to the present invention is useful as a highly-safe electrical wire coating material that is hard to cause short-circuit accidents at a high temperature. Examples of the electrical wire coating material include various electrical wire coatings molded by extrusion molding, specifically, those intended for power generators such as a solar power generator, vehicles such as an automobile, architectural applications, electrical equipment and flat cables. The electrical wire molded body obtained by the production process according to the present invention is useful as solar cables used in an outdoor severe environment for a long term. Especially, an electrical wire molded body usable for solar cable applications is formed by coating an insulating material on a conductor and then coating the claimed composition (composition obtained by mixing, in step III, the components (A) and (B) obtained in steps I and II, respectively) on the insulating material coating.

The diameter of the electrical wire molded body and types of the conductor and sheath are appropriately selected depending on the site and purpose of use in a solar system, without any limitation.

The suitability of the electrical wire molded body of the present invention for solar cables is demonstrated by its adaptation to the hot set test as defined in TUV2Pfg1169. TUV2Pfg1169 is one of the most reliable standards as solar cable safety standards, and electrical wire molded bodies which meet this standard are regarded as having high safety required of solar cables. Thus, the electrical wire molded body obtained by the production process according to the present invention enables the production of a solar cable having higher weather resistance and heat resistance and safety.

EXAMPLES

Hereinafter, the present invention will be further explained by way of Examples and Comparative Examples, but is not limited thereto. In the meantime, the evaluation method and materials used in Examples are indicated below.
[Component (A): Silane Crosslinkable Flame Retardant Polyolefin]
Component (a):
(a-1) Copolymer of ethylene and vinyl acetate (EVA): EVAFLEX EV180 (manufactured by DU PONT-MITSUI POLYCHEMICALS), vinyl acetate content: 33% by weight, MFR: 0.2 g/10 min.

(a-2) Copolymer of ethylene and vinyl acetate (EVA): V9000 (manufactured by DU PONT-MITSUI POLYCHEMICALS), vinyl acetate content: 41% by weight, MFR: 0.3 g/10 min.

(a-3) Linear low-density polyethylene using metallocene-based catalyst: Kernel KF360T (manufactured by Japan Polyethylene Corporation), density: 0.898 g/cm$^3$, MFR: 3.5 g/10 min.

Component (b):
Crystalline propylene-based block copolymer: PB270A (manufactured by SunAllomer Ltd.), MFR: 0.7 g/10 min., peak top temperature (Tm): 160° C.

Component (c):
Hydrogenated block copolymer: SEPTON4055 (manufactured by KURARAY CO., LTD.), styrene content: 30% by weight; styrene-ethylene/ethylene/propylene-styrene block copolymer (SEEPS), weight average molecular weight: 260,000, number average molecular weight: 200,000, molecular weight distribution (Mw/Mn): 1.3, hydrogenation rate: 90 mol % or more Component (d):
Maleic anhydride-modified polyethylene: Fusabond N493 (manufactured by Du Pont Co., Ltd.), acid modification rate: 0.5%, MFR: 1.6 g/10 min.

Component (e):
Paraffin oil: Diana Process Oil PW-90 (manufactured by Idemitsu Kosan Co., Ltd.), dynamic viscosity (40° C., 95.54 cst) (100° C., 11.25 cst), flow point: 15° C.

Component (f):
Organic peroxide: PERHEXA 25B (manufactured by Nippon Oil & Fats Co., Ltd.), 2,5-dimethyl-2,5-di(t-butyl peroxy)-hexane, one-minute half life temperature: 179° C.

Component (g):
Silane coupling agent: SZ6300 (manufactured by Dow Corning Toray Co., Ltd.), vinyltrimethoxysilane, average molecular weight: 148.2, boiling point: 125° C., flash point: 25° C.

Component (h):
Magnesium hydroxide: Magnifin H7 (manufactured by ALBEMARLE JAPAN CORPORATION), surface-untreated synthetic magnesium hydroxide, specific surface area: 8 m$^2$/g

[Component (B): Silanol Catalyst Resin Composition]
Polymer:
(a-1) Copolymer of ethylene and vinyl acetate (EVA): EVAFLEX EV180 (manufactured by DU PONT-MITSUI POLYCHEMICALS), vinyl acetate content: 33% by weight, MFR: 0.2 g/10 min.

(a-4) High-density polyethylene: HI-ZEX 5600B (manufactured by Prime Polymer Co., Ltd.), density: 935 kg/m$^3$, MFR: 0.45 g/10 min.

(i) Silanol Condensation Catalyst:
Neostan U-810 (manufactured by Nitto Kasei Co., Ltd.), dioctyltin dilaurate, melting point: 25° C., viscosity: 38 mPa·s/30° C.

[Evaluation Methods Used in Various Tests on Electrical Wire Molded Bodies]
(1) Tensile Strength/Tensile Elongation:
JIS K 7113-compliant tapes which had been extrusion molded into a thickness of 2 mm were subjected to warm water treatment at 80° C. for 24 hours, and the treated tapes were punched out into No. 3 dumbbell-shaped test pieces for use. Also, the tension speed was defined as 200 mm/min. at room temperature.

(2) Extrusion Appearance:
The surface appearance of the extruded tapes was visually observed to detect the properties which damaged the surface smoothness and aesthetic appearance, such as surface texture and roughness, and flow marks. Those having good appearance without such properties being observed were evaluated as "good," and those having bad appearance with any of the properties being observed were evaluated as "bad."
(3) Heating Deformation Rate:
JIS C 3005-compliant tapes having a thickness of 2 mm were subjected to warm water treatment at 80° C. for 24 hours, and the treated tapes were punched out into test pieces for use. The test temperature was defined as 140° C. and the load was defined as 1 kg.
(4) Hot Set:
TUV2Pfg1169-compliant tapes which had been extrusion molded into a thickness of 2 mm were subjected to warm water treatment at 80° C. for 24 hours, and the treated tapes were punched out into No. 3 dumbbell-shaped test pieces for use. One cycle test was conducted at a test temperature of 200° C. and at a load of 20 N/cm$^2$ for 15 minutes and a load of 0 N/cm$^2$ for 5 minutes. By conducting the TUV2Pfg1169-compliant hot set test, test pieces which passed the same standard (elongation percentage: 100% or less under loaded conditions and 25% or less under load-free conditions) were indicated as "good" and those which failed to pass the same standard were indicated as "bad."
(5) Flame Retardance (Oxygen Index):
JIS K 7201-compliant sheets which had been press molded into a thickness of 3 mm were subjected to warm water treatment at 80° C. for 24 hours, and the treated sheets were punched out into test pieces for use.

Examples 1 to 16 and Comparative Examples 1 to 10

(1) Production of Components (A): Silane Crosslinkable Flame Retardant Polyolefins and Controls Thereof
All of components were dry blended at room temperature in accordance with the formulations as indicated in Table 1 below and molten and kneaded at a resin temperature of 200° to 230° C. by a pressurization kneader. After discharged, the resultant composition was formed into a sheet by an electric heating roll and pelletized by a pelletizer. As a result, silane crosslinkable flame retardant polyolefins, as the component (A) of the present invention, indicated as Formulations CO-FR1, CO-FR2, CO-FR3, CO-FR4, CO-FR5, CO-FR8, CO-FR9, CO—FR10, CO-FR11, CO-FR12, CO-FR13, CO-FR14 and CO-FR15 in Table 1 and silane crosslinkable flame retardant polyolefins (controls) indicated as Formulations CO-FR6 and CO-FR7 in Table 1 were obtained.
(2) Production of Components (B): Silanol Catalyst Resin Compositions and Controls Thereof
All of components used in amounts as indicated in Table 2 below were dry blended at room temperature and molten and kneaded at a temperature equal to or higher than the melting temperature of the polymer component (specifically, 150° to 200° C.) by a twin-screw extruder, and the resultant product was extruded into a strand shape, then cooled in a water tank, and pelletized by a pelletizer. As a result, silanol catalyst resin compositions, as the component (B) of the present invention, indicated as Formulations SMB1 and SMB4 in Table 2 and silanol catalyst resin compositions (controls) indicated as Formulations SMB2, SMB3 and SMB5 in Table 2 were obtained.
(3) Production of Other Control Components
All of components used in amounts as indicated in Table 3 below were dry blended at room temperature and molten and kneaded by a twin-screw extruder, and the resultant product was extruded into a strand shape, then cooled in a water tank, and pelletized by a pelletizer.
As a result, a silane crosslinkable polyolefin (control) indicated as Formulation CO1 in Table 3 was obtained.
All of components used in amounts as indicated in Table 4 below were dry blended at room temperature and molten and kneaded by a pressurization kneader. After discharged, the resultant composition was formed into a sheet by an electric heating roll and pelletized by a pelletizer. As a result, a flame retardant resin composition (control) indicated as Formulation FR1 in Table 4 was obtained.
(4) Production and Evaluation of Molded Bodies
Pellets of the components (A), components (B) or controls obtained by the above-described (1), (2) or (3) were further dry blended in a ratio as indicated in Tables 5 and 6, extruded into a tape shape having a thickness of 2 mm by a 20-mm extruder, and subjected to warm water treatment at 80° C. for 24 hours. Thereafter, the resultant molded articles obtained were subjected to the above-described various evaluation tests. The evaluation results of the respective molded articles are indicated in Tables 5 and 6.

TABLE 1

Components (A): silane crosslinkable flame retardant polyolefins and controls thereof
Formulations

| Components | | | CO-FR1 | CO-FR2 | CO-FR3 | CO-FR4 | CO-FR5 | CO-FR6 (control) | CO-FR7 (control) |
|---|---|---|---|---|---|---|---|---|---|
| Components | (a) | (a-1) EV180 | 70 | 70 | 70 | 70 | 50 | 70 | 25 |
| | | (a-2) V9000 | 0 | 0 | 0 | 0 | 0 | 0 | 0 |
| | | (a-3) KF360T | 0 | 0 | 0 | 0 | 0 | 0 | 0 |
| | (b) | PB270A | 10 | 10 | 10 | 10 | 15 | 10 | 50 |
| | (c) | SEPTON 4055 | 8 | 8 | 8 | 8 | 20 | 8 | 10 |
| | (d) | N493 | 5 | 5 | 5 | 5 | 5 | 5 | 5 |
| | (e) | PW-90 | 7 | 7 | 7 | 7 | 10 | 7 | 10 |
| Total of (a)-(e) (parts by weight) | | | 100 | 100 | 100 | 100 | 100 | 100 | 100 |
| | (f) | PERHEXA 25B | 0.4 | 0.3 | 0.4 | 0.4 | 0.4 | 0.05 | 0.4 |
| | (g) | SZ 6300 | 4 | 2 | 4 | 4 | 4 | 0.5 | 4 |
| | (h) | Magnifin H7 | 150 | 150 | 220 | 80 | 150 | 150 | 150 |
| Total (parts by weight) | | | 254.4 | 252.3 | 324.4 | 184.4 | 254.4 | 250.55 | 254.4 |

TABLE 1-continued

Components (A): silane crosslinkable flame retardant polyolefins and controls thereof
Formulations

| | | | CO-FR8 | CO-FR9 | CO-FR10 | CO-FR11 | CO-FR12 | CO-FR13 | CO-FR14 | CO-FR15 |
|---|---|---|---|---|---|---|---|---|---|---|
| Components | (a) | (a-1) EV180 | 100 | 0 | 0 | 70 | 90 | 60 | 70 | 70 |
| | | (a-2) V9000 | 0 | 70 | 0 | 0 | 0 | 0 | 0 | 0 |
| | | (a-3) KF360T | 0 | 0 | 70 | 0 | 0 | 0 | 0 | 0 |
| | (b) | PB270A | 0 | 10 | 10 | 0 | 0 | 0 | 10 | 30 |
| | (c) | SEPTON 4055 | 0 | 8 | 8 | 30 | 0 | 20 | 8 | 0 |
| | (d) | N493 | 0 | 5 | 5 | 0 | 10 | 0 | 5 | 0 |
| | (e) | PW-90 | 0 | 7 | 7 | 0 | 0 | 20 | 7 | 0 |
| | Total of (a)-(e) (parts by weight) | | 100 | 100 | 100 | 100 | 100 | 100 | 100 | 100 |
| | (f) | PERHEXA 25B | 0.15 | 0.4 | 0.4 | 0.15 | 0.15 | 0.4 | 0.8 | 0.4 |
| | (g) | SZ 6300 | 2 | 4 | 4 | 4 | 4 | 4 | 4 | 4 |
| | (h) | Magnifin H7 | 60 | 150 | 150 | 150 | 150 | 150 | 150 | 150 |
| | Total (parts by weight) | | 162.15 | 254.4 | 254.4 | 254.15 | 254.15 | 254.4 | 254.8 | 254.4 |

TABLE 2

Components (B): silanol catalyst resin compositions and controls thereof

| | | | | Formulations | | | | |
|---|---|---|---|---|---|---|---|---|
| | | | | SMB1 | SMB2 (control) | SMB3 (control) | SMB4 | SMB5 (control) |
| Components | (a) | (a-1) EV180 | | 100 | 100 | 100 | 0 | 100 |
| | | (a-4) HZ5600B | | 0 | 0 | 0 | 100 | 0 |
| | (i) | Neostan U-810 | | 3 | 0.05 | 10 | 3 | 3 |
| | (h) | Magnifin H7 | | 0 | 0 | 0 | 0 | 150 |
| | Total (parts by weight) | | | 103 | 100.05 | 110 | 103 | 253 |

TABLE 3

Control component (silane crosslinkable polyolefin)

| | | | Formulations CO1 (control) |
|---|---|---|---|
| Components | (a) | (a-1) EV180 | 100 |
| | Total of (a) (parts by weight) | | 100 |
| | (f) | PERHEXA 25B | 0.1 |
| | (g) | SZ 6300 | 2 |
| | Total (parts by weight) | | 102.1 |

TABLE 4

Control component (flame retardant resin composition)

| | | | Formulations FR1 (control) |
|---|---|---|---|
| Components | (a) | (a-1) EV180 | 100 |
| | Total of (a) (parts by weight) | | 100 |
| | (h) | Magnifin H7 | 150 |
| | Total (parts by weight) | | 250 |

TABLE 5

| | | | Examples | | | | | | | |
|---|---|---|---|---|---|---|---|---|---|---|
| | | | Ex. 1 | Ex. 2 | Ex. 3 | Ex. 4 | Ex. 5 | Ex. 6 | Ex. 7 | Ex. 8 |
| Components | Component (A): silane crosslinkable flame retardant polyolefin (parts by weight) | CO-FR1 | 100 | | | | | | | |
| | | CO-FR2 | | 100 | | | | | | |
| | | CO-FR3 | | | 100 | | | | | |
| | | CO-FR4 | | | | 100 | | | | |
| | | CO-FR5 | | | | | 100 | | | |
| | | CO-FR8 | | | | | | 100 | | |
| | | CO-FR9 | | | | | | | 100 | |
| | | CO-FR10 | | | | | | | | 100 |
| | | CO-FR11 | | | | | | | | |

TABLE 5-continued

| | | | Examples | | | | | | | |
|---|---|---|---|---|---|---|---|---|---|---|
| | | CO-FR12 | | | | | | | | |
| | | CO-FR13 | | | | | | | | |
| | | CO-FR14 | | | | | | | | |
| | | CO-FR15 | | | | | | | | |
| | Component (B): silanol catalyst resin composition (parts by weight) | SMB1 | 5 | 2.5 | 8 | | 5 | 5 | 5 | 5 |
| | | SMB4 | | | | 5 | | | | |
| | | Unit | | | | | | | | |
| Evaluation results | Tensile strength | MPa | 11.4 | 11.1 | 10.7 | 11.7 | 10.9 | 10 | 13.3 | 12.1 |
| | Tensile elongation | % | 235 | 223 | 240 | 218 | 246 | 152 | 321 | 230 |
| | Extrusion appearance | — | GOOD | GOOD | GOOD | GOOD | GOOD | GOOD | GOOD | GOOD |
| | Heating deformation rate | % | 15 | 12 | 16 | 15 | 17 | 11 | 20 | 10 |
| | Hot set | — | GOOD | GOOD | GOOD | GOOD | GOOD | GOOD | GOOD | GOOD |
| | Flame retardance | — | 34 | 34 | 33 | 33 | 34 | 41 | 27 | 33 |

| | | | Ex. 9 | Ex. 10 | Ex. 11 | Ex. 12 | Ex. 13 | Ex. 14 | Ex. 15 | Ex. 16 |
|---|---|---|---|---|---|---|---|---|---|---|
| Components | Component (A): silane crosslinkable flame retardant polyolefin (parts by weight) | CO-FR1 | | | | | | | | |
| | | CO-FR2 | | | | | | | | |
| | | CO-FR3 | | | | | | | | |
| | | CO-FR4 | | | | | | | | |
| | | CO-FR5 | | | | | | | | |
| | | CO-FR8 | 100 | | | | | | | |
| | | CO-FR9 | | 100 | | | | | | |
| | | CO-FR10 | | | 100 | | | | | |
| | | CO-FR11 | | | | 100 | | | | |
| | | CO-FR12 | | | | | 100 | | | |
| | | CO-FR13 | | | | | | 100 | | |
| | | CO-FR14 | | | | | | | 100 | |
| | | CO-FR15 | | | | | | | | 100 |
| | Component (B): silanol catalyst resin composition (parts by weight) | SMB1 | 5 | 5 | 5 | 5 | 5 | 5 | 5 | 5 |
| | | SMB4 | | | | | | | | |
| | | Unit | | | | | | | | |
| Evaluation results | Tensile strength | MPa | 13 | 11.3 | 13.2 | 12.7 | 12.3 | 10.2 | 13.1 | 10.3 |
| | Tensile elongation | % | 613 | 255 | 263 | 303 | 193 | 250 | 183 | 153 |
| | Extrusion appearance | — | GOOD | GOOD | GOOD | GOOD | GOOD | GOOD | GOOD | GOOD |
| | Heating deformation rate | % | 23 | 15 | 19 | 12 | 30 | 28 | 12 | 18 |
| | Hot set | — | GOOD | GOOD | GOOD | GOOD | GOOD | GOOD | GOOD | GOOD |
| | Flame retardance | — | 25 | 34 | 31 | 33 | 33 | 27 | 34 | 29 |

TABLE 6

| | | | Comparative Examples | | | | | | | | | |
|---|---|---|---|---|---|---|---|---|---|---|---|---|
| | | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
| Components | Component (A): silane crosslinkable flame retardant polyolefin (parts by weight) | CO-FR1 | 100 | 100 | 100 | 100 | | | | | | |
| | | CO-FR6 (control) | | | | | 100 | | | | | |
| | | CO-FR7 (control) | | | | | | 100 | | | | |
| | Component (B): silanol catalyst resin composition (parts by weight) | SMB1 | | 14 | | | 5 | 5 | | | 5 | 5 |
| | | SMB2 (control) | | | 5 | | | | | | | |
| | | SMB3 (control) | | | | 5 | | | | | | |
| | | SMB5 (control) | | | | | | | 20 | 80 | | |
| | Control component: silane crosslinkable polyolefin (parts by weight) | CO1 (control) | | | | | | | 80 | 20 | 80 | 20 |
| | Control component: flame retardant resin composition (parts by weight) | FR1 (control) | | | | | | | | | 20 | 80 |

TABLE 6-continued

| | | | Comparative Examples | | | | | | | | | |
|---|---|---|---|---|---|---|---|---|---|---|---|---|
| | | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
| | | Unit | | | | | | | | | | |
| Evaluation results | Tensile strength | MPa | 11.4 | 9.7 | 11 | 11.5 | 11.8 | 11 | 16 | 8.8 | 17.2 | 8.2 |
| | Tensile elongation | % | 211 | 250 | 230 | 177 | 294 | 110 | 635 | 490 | 634 | 523 |
| | Extrusion appearance | — | GOOD | BAD | GOOD | BAD | GOOD | GOOD | GOOD | BAD | GOOD | GOOD |
| | Heating deformation rate | % | 18 | 18 | 20 | 9 | 20 | 5 | 29 | 45 | 25 | 51 |
| | Hot set | — | BAD | GOOD | BAD | GOOD | BAD | BAD | GOOD | BAD | GOOD | BAD |
| | Flame retardance | — | 35 | 32 | 34 | 34 | 34 | 32 | 18 | 28 | 16 | 27 |

As can be seen from the evaluation results indicated in Table 5, electrical wire molded bodies excellent in all of tensile strength, tensile elongation, extrusion appearance, heating deformability, hot set test results and flame retardance were obtained in Examples 1 to 16 in which the production process according to the present invention was carried out.

On the other hand, as can be seen from the evaluation results indicated in Table 6, Comparative Example 1 employing the component (A) alone without silane crosslinking is inferior in hot set test results and cannot provide heat resistance. Comparative Example 2 without employing the predetermined weight ratio between the components (A) and (B) in step III is inferior in extrusion appearance. Comparative Examples 3 and 4 employing the controls of the components (A) and (B) are inferior in any of tensile elongation, extrusion appearance and hot set test results. Comparative Examples 5 and 6 employing the control of the component (A) and the component (B) are inferior in hot set test results.

Comparative Examples 9 and 10 employing the controls CO1 and FR1 and the component (B) are inferior in any of heating deformability, hot set test results and flame retardance. Also, Comparative Examples 7 and 8 employing the two controls alone are inferior in any of heating deformability, hot set test results and flame retardance. In this manner, molded bodies prominently inferior in any one or more of tensile strength, tensile elongation, extrusion appearance, heating deformability, hot set test results and flame retardance were merely obtained in Comparative Examples 1 to 10 in which a production process failing to satisfy the predetermined condition in any of steps I, II and III of the present invention was carried out.

The present invention has been explained in detail with reference to specific embodiments, but can be variously changed and modified without departing from the sprint and scope of the present invention, as is apparent to those skilled in the art.

The present application is based on Japanese Patent Application No. 2011-128583 filed on Jun. 8, 2011, the entirety of which is incorporated herein by reference. Also, all references cited herein are incorporated herein by reference in their entireties.

INDUSTRIAL APPLICABILITY

The process for producing an electrical wire molded body according to the present invention enables the production of an electrical wire molded body having all of flame retardance, heat resistance, strength, flexibility and appearance at high levels through easy steps. The electrical wire molded body obtained by the production process of the present invention has high flame retardance and heat resistance, and thus exerts high safety even in a severe environment, and therefore is especially useful in solar cables.

The invention claimed is:

1. A process for producing an electrical wire molded body comprising:
    melting and kneading 30 parts to 100 parts by weight of component (a): a polyethylene-based resin, 0 part to 40 parts by weight of component (b): a polypropylene-based resin, 0 part to 40 parts by weight of component (c): a block copolymer of an aromatic vinyl-based compound and a conjugated diene-based compound and/or a hydrogenated product thereof, 5 parts to 15 parts by weight of component (d): an acid-modified resin and 0 part to 30 parts by weight of component (e): a non-aromatic softening agent for rubber (provided that the total amount of the components (a), (b), (c), (d) and (e) is defined as 100 parts by weight), and 0.2 parts to 0.6 parts by weight of component (f): an organic peroxide, 1 part to 6 parts by weight of component (g): a silane coupling agent and 50 parts to 250 parts by weight of component (h): a metal hydrate based on 100 parts by weight of the total amount of the components (a), (b), (c), (d) and (e), all at once, at a temperature equal to or higher than the reaction temperature of the component (f): organic peroxide, to react the resin component comprising (a) to (e) with the silane coupling agent (g) thereby producing component (A) which is a silane crosslinkable flame retardant polyolefin comprising a reactant of the resin component with the silane coupling agent;
    melting and kneading 100 parts by weight of at least one polymer selected from the group consisting of the components (a), (b) and (c) and 0.1 part to 8 parts by weight of component (i): a silanol condensation catalyst, to produce component (B), which is a silanol catalyst resin composition; and
    mixing the components (A) and (B) in a ratio of (A):(B) =10:1 to 100:1 (weight ratio) to form a mixture, melt molding the mixture on a conductor to form a molded body and then crosslinking the molded body in the presence of water.

2. The process for producing an electrical wire molded body according to claim 1, wherein the component (a): polyethylene-based resin is at least one polymer selected from the group consisting of an ethylene homopolymer, an ethylene/α-olefin copolymer, an ethylene/ethyl acrylate copolymer (EEA), an ethylene/methyl methacrylate copolymer (EMMA), an ethylene/vinyl acetate copolymer (EVA), and an ethylene/ethyl methacrylate copolymer (EMA).

3. The process for producing an electrical wire molded body according to claim 1, wherein the component (d): acid-modified resin is an acid-modified polyolefin and/or acid-modified styrene-based elastomer.

4. The process for producing an electrical wire molded body according to claim 1, wherein the component (h): metal hydrate is magnesium hydroxide and/or aluminum hydroxide.

5. The process for producing an electrical wire molded body according to claim 1, wherein the component (h): metal hydrate is an untreated and/or fatty acid-treated metal hydrate.

6. The process for producing an electrical wire molded body according to claim 1, wherein the melt molding is melt extrusion molding.

7. The process for producing an electrical wire molded body according to claim 1, wherein the electrical wire molded body obtained by the process has elongation percentage of 100% or less under loaded conditions and 25% or less under load-free conditions when conducting one cycle test for the electrical wire molded body at a test temperature of 200° C. and at a load of 20 $N/cm^2$ for 15 minutes and a load of 0 $N/cm^2$ for 5 minutes.

* * * * *